(12) United States Patent
McCullough et al.

(10) Patent No.: US 12,130,533 B2
(45) Date of Patent: Oct. 29, 2024

(54) ELECTRO-OPTIC ASSEMBLIES AND MATERIALS FOR USE THEREIN

(71) Applicant: E INK CORPORATION, Billerica, MA (US)

(72) Inventors: Lynne A. McCullough, Medford, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/225,216

(22) Filed: Jul. 24, 2023

(65) Prior Publication Data

US 2024/0019751 A1    Jan. 18, 2024

Related U.S. Application Data

(63) Continuation of application No. 16/677,947, filed on Nov. 8, 2019, now Pat. No. 11,754,903.

(60) Provisional application No. 62/768,572, filed on Nov. 16, 2018.

(51) Int. Cl.
*G02F 1/167*    (2019.01)
*G02F 1/1675*    (2019.01)

(52) U.S. Cl.
CPC ............ *G02F 1/167* (2013.01); *G02F 1/1675* (2019.01); *G02F 2001/1678* (2013.01)

(58) Field of Classification Search
CPC ............ G02F 1/167; G02F 2001/1678; G02F 1/1675; G02F 1/16757; G02F 1/1676; G02F 2202/02; C01P 2004/84; C01P 2002/88; C01P 2004/32; C01P 2004/51; C01P 2004/61; C01P 2004/62; C01P 2004/64; C01P 2004/82; C01P 2006/10; C01P 2006/40; C01P 2006/60; C01P 2006/80; C01P 2006/90
See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |

(Continued)

OTHER PUBLICATIONS

Wood, D., "An Electrochromic Renaissance?", Information Display, 18(3), Mar. 24, 2002.

(Continued)

*Primary Examiner* — Brandi N Thomas
(74) *Attorney, Agent, or Firm* — Ioannis Constantinides

(57) ABSTRACT

An electro-optic medium including an encapsulated material and a binder, the encapsulated material being configured to switch optical states upon application of an electric field, and the binder including a polymer having a plurality of side chains, wherein at least a portion of the side chains have an ionic moiety.

20 Claims, 5 Drawing Sheets
(4 of 5 Drawing Sheet(s) Filed in Color)

(56) References Cited

U.S. PATENT DOCUMENTS

| | | |
|---|---|---|
| 6,120,588 A | 9/2000 | Jacobson |
| 6,120,839 A | 9/2000 | Comiskey et al. |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,693,620 B1 | 2/2004 | Herb et al. |
| 6,721,083 B2 | 4/2004 | Jacobson et al. |
| 6,727,881 B1 | 4/2004 | Albert et al. |
| 6,822,782 B2 | 11/2004 | Honeyman et al. |
| 6,831,771 B2 | 12/2004 | Ho et al. |
| 6,839,158 B2 | 1/2005 | Albert et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,914,713 B2 | 7/2005 | Chung et al. |
| 6,922,276 B2 | 7/2005 | Zhang et al. |
| 6,927,892 B2 | 8/2005 | Ho et al. |
| 6,950,220 B2 | 9/2005 | Abramson et al. |
| 6,956,690 B2 | 10/2005 | Yu et al. |
| 6,958,848 B2 | 10/2005 | Cao et al. |
| 6,958,849 B2 | 10/2005 | Chen et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,038,655 B2 | 5/2006 | Herb et al. |
| 7,052,766 B2 | 5/2006 | Zang et al. |
| 7,075,502 B1 | 7/2006 | Drzaic et al. |
| 7,110,162 B2 | 9/2006 | Wu et al. |
| 7,110,164 B2 | 9/2006 | Paolini, Jr. et al. |
| 7,113,323 B2 | 9/2006 | Ho et al. |
| 7,116,318 B2 | 10/2006 | Amundson et al. |
| 7,141,688 B2 | 11/2006 | Feng et al. |
| 7,142,351 B2 | 11/2006 | Chung et al. |
| 7,170,670 B2 | 1/2007 | Webber |
| 7,173,752 B2 | 2/2007 | Doshi et al. |
| 7,184,197 B2 | 2/2007 | Liang et al. |
| 7,202,991 B2 | 4/2007 | Zhang et al. |
| 7,226,550 B2 | 6/2007 | Hou et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,277,218 B2 | 10/2007 | Iwang et al. |
| 7,286,279 B2 | 10/2007 | Yu et al. |
| 7,304,634 B2 | 12/2007 | Albert et al. |
| 7,312,784 B2 | 12/2007 | Baucom et al. |
| 7,312,916 B2 | 12/2007 | Pullen et al. |
| 7,321,459 B2 | 1/2008 | Masuda |
| 7,339,715 B2 | 3/2008 | Webber et al. |
| 7,382,514 B2 | 6/2008 | Hsu et al. |
| 7,390,901 B2 | 6/2008 | Yang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,473,782 B2 | 1/2009 | Yang et al. |
| 7,477,444 B2 | 1/2009 | Cao et al. |
| 7,535,624 B2 | 5/2009 | Amundson et al. |
| 7,561,324 B2 | 7/2009 | Duthaler et al. |
| 7,572,394 B2 | 8/2009 | Gu et al. |
| 7,576,904 B2 | 8/2009 | Chung et al. |
| 7,580,180 B2 | 8/2009 | Ho et al. |
| 7,679,814 B2 | 3/2010 | Paolini, Jr. et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 7,910,175 B2 | 3/2011 | Webber |
| 7,952,790 B2 | 5/2011 | Honeyman et al. |
| 8,009,348 B2 | 8/2011 | Zehner et al. |
| 8,018,640 B2 | 9/2011 | Whitesides et al. |
| 8,035,886 B2 | 10/2011 | Jacobson |
| 8,115,729 B2 | 2/2012 | Danner et al. |
| 8,129,655 B2 | 3/2012 | Jacobson et al. |
| 8,257,614 B2 | 9/2012 | Gu et al. |
| 8,270,064 B2 | 9/2012 | Feick et al. |
| 8,305,341 B2 | 11/2012 | Arango et al. |
| 8,363,306 B2 | 1/2013 | Du et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,654,436 B1 | 2/2014 | Feick |
| 8,902,491 B2 | 12/2014 | Wang et al. |
| 8,961,831 B2 | 2/2015 | Du et al. |
| 9,052,564 B2 | 6/2015 | Sprague et al. |
| 9,341,915 B2 | 5/2016 | Yang et al. |
| 9,348,193 B2 | 5/2016 | Hiji et al. |
| 9,361,836 B1 | 6/2016 | Telfer et al. |
| 9,366,935 B2 | 6/2016 | Du et al. |
| 9,372,380 B2 | 6/2016 | Du et al. |
| 9,382,427 B2 | 7/2016 | Du et al. |
| 9,423,666 B2 | 8/2016 | Wang et al. |
| 9,428,649 B2 | 8/2016 | Li et al. |
| 9,557,623 B2 | 1/2017 | Wang et al. |
| 9,664,978 B2 | 5/2017 | Arango et al. |
| 9,670,367 B2 | 6/2017 | Li et al. |
| 9,688,859 B2 | 6/2017 | Yezek et al. |
| 9,726,957 B2 | 8/2017 | Telfer et al. |
| 9,778,537 B2 | 10/2017 | Wang et al. |
| 9,835,926 B2 | 12/2017 | Sprague et al. |
| 9,921,451 B2 | 3/2018 | Telfer et al. |
| 10,036,930 B2 | 7/2018 | Whitesides et al. |
| 10,174,232 B2 | 1/2019 | Bzowej et al. |
| 10,444,553 B2 | 10/2019 | Laxton |
| 10,761,395 B2 | 9/2020 | Du et al. |
| 10,824,042 B1 | 11/2020 | Amundson |
| 10,849,337 B2 | 12/2020 | Geremia et al. |
| 2003/0048522 A1 | 3/2003 | Liang et al. |
| 2003/0151029 A1 | 8/2003 | Hsu et al. |
| 2003/0164480 A1 | 9/2003 | Wu et al. |
| 2004/0030125 A1 | 2/2004 | Li et al. |
| 2005/0012980 A1 | 1/2005 | Wilcox et al. |
| 2005/0105159 A1* | 5/2005 | Paolini, Jr. ............... G02F 1/167 359/321 |
| 2005/0156340 A1 | 7/2005 | Valianatos et al. |
| 2007/0091417 A1 | 4/2007 | Cao et al. |
| 2008/0130092 A1 | 6/2008 | Whitesides et al. |
| 2009/0009852 A1 | 1/2009 | Honeyman et al. |
| 2009/0096355 A1* | 4/2009 | Ohuchi ............... C08G 61/12 427/256 |
| 2009/0122389 A1 | 5/2009 | Whitesides et al. |
| 2009/0244693 A1 | 10/2009 | Nishio et al. |
| 2010/0148385 A1 | 6/2010 | Balko et al. |
| 2011/0217639 A1 | 9/2011 | Sprague |
| 2011/0286081 A1 | 11/2011 | Jacobson |
| 2012/0049125 A1 | 3/2012 | Du et al. |
| 2013/0161565 A1 | 6/2013 | Laxton |
| 2013/0193385 A1 | 8/2013 | Li et al. |
| 2013/0244149 A1 | 9/2013 | Wang et al. |
| 2014/0011913 A1 | 1/2014 | Du et al. |
| 2014/0078024 A1 | 3/2014 | Paolini, Jr. et al. |
| 2014/0078576 A1 | 3/2014 | Sprague |
| 2014/0078857 A1 | 3/2014 | Nelson et al. |
| 2014/0104674 A1 | 4/2014 | Ting et al. |
| 2014/0193504 A1* | 7/2014 | Wooley ............... A61K 47/593 525/538 |

(56) References Cited

U.S. PATENT DOCUMENTS

| | | |
|---|---|---|
| 2014/0231728 A1 | 8/2014 | Du et al. |
| 2015/0005720 A1 | 1/2015 | Zang et al. |
| 2015/0177590 A1 | 6/2015 | Laxton |
| 2015/0185509 A1 | 7/2015 | Wang et al. |
| 2015/0301425 A1 | 10/2015 | Du et al. |
| 2016/0012710 A1 | 1/2016 | Lu et al. |
| 2016/0170106 A1 | 6/2016 | Wang et al. |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochemical for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office, "International Search Report and Written Opinion", PCT/US2023/028441, Jan. 22, 2024.

\* cited by examiner

ELECTRO-OPTIC ASSEMBLIES AND MATERIALS FOR USE THEREIN

CROSS-REFERENCE TO RELATED APPLICATIONS

This application claims the benefit of and priority to U.S. Provisional Patent Application having Ser. No. 62/768,572, filed on Nov. 16, 2018, the contents of which are incorporated by reference herein in their entireties.

BACKGROUND OF INVENTION

Electro-optic assemblies useful in the production of electro-optic displays, and to materials for use in such assemblies are disclosed. More specifically, binder compositions having controlled volume resistivity, and electro-optic assemblies incorporating such materials, are disclosed.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/

0248045; 2015/0301425; 2015/0378236; 2016/0139483; and 2016/0170106;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating, spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are encapsulated and suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038, 6,870,657, and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Electro-optic displays manufactured using lamination procedures normally have a layer of lamination adhesive between the electro-optic layer itself and the backplane, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the adhesive and/or binder with an inorganic or organic salt, such as potassium acetate, tetrabutylammonium chloride, tetrabutylammonium hexafluorophosphate, or other materials as described in the aforementioned U.S. Pat. Nos. 7,012,735 and 7,173,752. However, increasing the conductivity of the lamination adhesive tends to increase pixel blooming (a phenomenon whereby the area of the electro-optic layer which changes optical state in response to change of voltage at a pixel electrode is larger than the pixel electrode itself), and this blooming tends to reduce the resolution of the display.

To prevent blooming without negatively impacting temperature performance, dopants have been incorporated into the binder system of the electro-optic media, rather than the lamination adhesive. For example, colored encapsulated electrophoretic media, particularly multicolored capsules with four pigments, highly conductive binders have demonstrated improved performance in electro-optic states, color gamut, and temperature performance, as well as blooming. Achieving sufficiently high conductivities in the binder to obtain these results, however, is difficult with small molecule additives like tetrabutylammonium hexafluorophosphate. High concentrations of the dopants are required, and these high levels of concentration will significantly alter the mechanical properties of the binder, often leading to lamination and coating difficulties, or poor adhesion. Furthermore, the small molecule dopants may diffuse out of the binder and into the lamination adhesive.

Thus, there is a need for improved binder compositions for electro-optic displays and assemblies.

SUMMARY OF THE INVENTION

One aspect of the present invention is an electro-optic medium comprising an encapsulated material and a binder, the encapsulated material being configured to switch optical states upon application of an electric field, and the binder comprising a polymer having a plurality of side chains, wherein at least a portion of the side chains comprise an ionic moiety.

These and other aspects of the present invention will be apparent in view of the following description.

BRIEF DESCRIPTION OF DRAWINGS

The patent or application file contains at least one drawing executed in color. Copies of this patent or patent application publication with color drawing(s) will be provided by the Office upon request and payment of the necessary fee.

The drawing Figures depict one or more implementations in accord with the present concepts, by way of example only, not by way of limitations. In the figures, like reference numerals refer to the same or similar elements.

DETAILED DESCRIPTION

Figure 1:
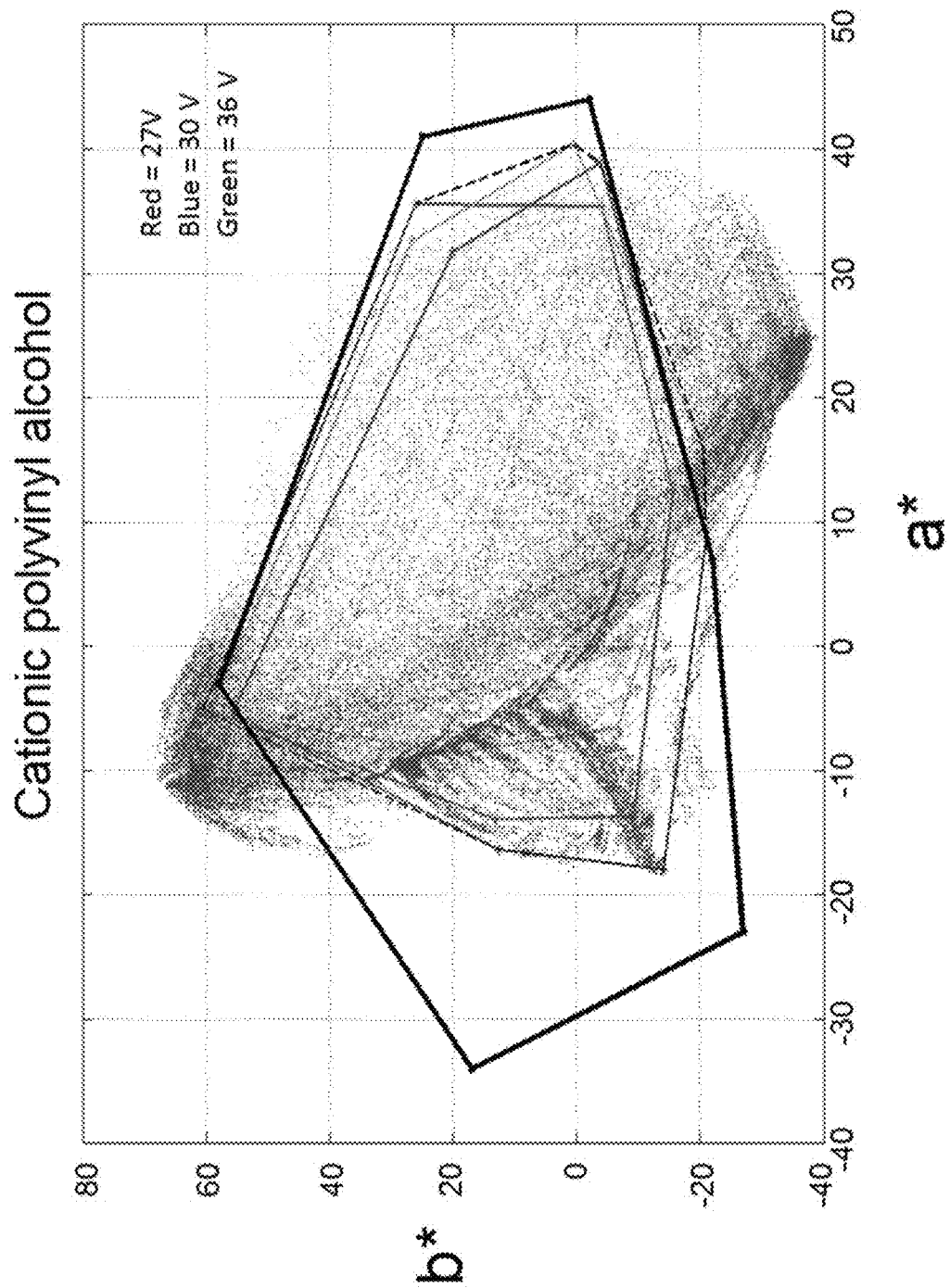
FIGS. 1 to 3 are graphs illustrating a color gamut produced from colors measured from display samples comprising various electro-optic media having a binder according to an embodiment of the present invention.

Generally, the various embodiments of the present invention provide an electro-optic medium comprising an encapsulated material configured to switch optical states upon the application of an electric field and a binder that comprises a polymer having a plurality of side chains, wherein at least a portion of the side chains comprise an ionic moiety. As used herein throughout the specification and the claims, "polymer" includes both homo-polymers and copolymers. The polymer is preferably a polyion having a high molecular weight (about 100,000 g/mol up to 1,000,000 g/mol), more preferably a polycation, most preferably a polycation comprising quaternized amines. The polymers are preferably good film-forming polymers. When mixed into the binder and applied as a layer, the resulting film preferably exhibits consistent mechanical properties over the entire area of the film and is chemically compatible with the other materials within the display stack when incorporated into a display, such that phase separation is minimized or eliminated.

The conductivity of the polymer in the binder may be controlled by varying the molecular weight of the polymer or the number of ionic side chains along the polymeric backbone of the polymer. Blends of polymers may also be used in the binder compositions according to the various embodiments of the present invention. The polymers with ionic side chains preferably exhibits a faint color, e.g. a pale yellow, but are more preferably colorless. The films containing the polymers preferably exhibit substantially uniform conductivity over the area of the film, and preferably maintain this property over time to improve the lifetime operation of the display.

As previously noted, the binder compositions made according to the various embodiments of the present invention may be included in various types of encapsulated electro-optic materials, such as rotating bichromal members, electrowetting materials, or electrophoretic media. The binder included in the various embodiments of the present invention are particularly well suited for encapsulated electrophoretic media comprising a plurality of electrically charged particles and a fluid, the charged particles being movable upon application of the electric field. The plurality of electrically charged particles may comprise at least two differently colored particles, such as red, green, blue, cyan, magenta, yellow, black, and white.

The one or more polymers containing ionic side chains that may be included in the binder compositions according to the various embodiments of the present invention are preferably highly conductive. The one or more polymers may have a conductivity of about $10^{-10}$ to $10^{-1}$ S/cm, preferably about $10^{-9}$ to about $10^{-2}$ S/cm, more preferably about $10^{-8}$ to about $10^{-4}$ S/cm, and most preferably a conductivity of about $10^{-7}$ to $10^{-6}$ S/cm.

The ionic functionality of the polymer may be covalently bonded to the polymeric backbone of the polymer. The ionic functionality present in the side chains may be provided by anionic moieties, cationic moieties, zwitterionic moieties, and combinations thereof. When the functionality of the side chains is anionic, it is preferred that functionality is provided by moieties that are not pH sensitive, such as sulfonic or phosphonic acid groups. Of the total number of side chains bonded to the polymeric backbone, the ionic side chains may constitute with increasing preference in the order given, at least 5%, 10%, 15%, 20%, 25%, 30%, 35%, and 40%, and not more than, with increasing preference in the order given, 100%, 95%, 90%, 85%, 80%, 75%, 70%, 65%, 60%, 55%, 50%, and 45%. As previously noted, the conductivity of the polymers may be controlled, not only by the number of ionic side chains, but also by the molecular weight of the polymers. The ionic polymers included in the various embodiments of the present invention may have a number average molecular weight, with increasing preference in the order give, of at least 20,000; 50,000; 100,000; 150,000; 200,000; 250,000; 300,000; 350,000; and 400,000 g/mol, and not more than, with increasing preference in the order given, 1,000,000; 950,000; 900,000; 850,000; 800,000; 750,000; 700,000; 650,000; 600,000; 550,000; and 500,000 g/mol.

The molecular weight of the polymer, as well as its glass transition temperature (Tg), may be selected depending on the desired mechanical properties of the final film containing the polymer, as well as the desired physical properties of the materials during processing, such as lamination, when fabricating a display.

The ionic polymers may be straight or branched polymers, e.g. comb polymers, brush polymers, dendritic polymers, star-shaped polymers, etc. The polymeric backbone may be derived from one or more polymers including, but not limited to, polyvinyl alcohol, polyvinylpyrrolidone, polyvinyl acetate, polyacrylates, polymethacrylates, polyurethanes, polysaccharides, polyolefins, polyethers, polyesters, polypeptides, proteins, and combinations thereof. In order to provide the polymeric backbone of the one or more polymers with ionic side chains, the one or more polymers may be functionalized by reacting the one or more polymers with one or more or more compounds including, but not limited to, sulfonic acids, phosphonic acids, quaternary amines, pyridines, imidazoles, carboxylic acids, salts of the aforementioned compounds, and combinations thereof.

In addition to the polyions, the binder composition may further comprise one or more polymers and/or oligomers that are not functionalized with an ionic side chain, such as water-soluble polymers, water-borne polymers, oil-soluble polymers, thermoset (e.g. epoxies) and thermoplastic polymers (e.g. polyesters), and radiation-cured polymers. Optional additives may include additives, such as small molecule coating aids or thickeners to modify the viscosity of the binder.

Among the water-soluble polymers are the various polysaccharides, the polyvinyl alcohols, N-methylpyrrolidone, N-vinylpyrrolidone, the various Carbowax® species (Union Carbide, Danbury, Conn), and poly-2-hydroxyethylacrylate.

The water-dispersed or water-borne systems are generally latex compositions, typified by the Neorez® and Neocryl® resins (Zeneca Resins, Wilmington, Mass.), Acrysol® (Dow, Philadelphia, Pa.), Bayhydrol® (Bayer, Pittsburgh, Pa.), and the Cytec Industries (West Paterson, N.J.) HP line. These are generally lattices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a crosslinking reagent, such as an aziridine, for example, which reacts with carboxyl groups.

The electro-optic media according to the various embodiments of the present invention comprise a blend of the aforementioned binder and encapsulated material. The internal phase of the electro-optic medium preferably includes charged pigment particles in a suspending fluid. The fluids may be of low dielectric constant (preferably less than 10 and desirably less than 3). Especially preferred solvents include aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of index matching agents such as Cargille® index matching fluids available from Cargille-Sacher Laboratories Inc. (Cedar Grove, NJ). In encapsulated media of the present invention, it is preferred that the refractive index of the dispersion of particles match as closely as possible that of the encapsulating material.

Charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entirety.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly (ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state. As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The gelatin-based capsule walls used in the variable transmission devices have been described in many of the E Ink and MIT patents and applications mentioned above. The gelatin is available from various commercial suppliers, such as Sigma Aldrich or Gelitia USA. It can be obtained in a variety of grades and purity depending upon the needs of the application. Gelatin primarily comprises collagen that has been collected from animal products (cow, pig, poultry, fish) and hydrolyzed. It comprises a mixture of peptides and proteins. In many of the embodiments described herein the gelatin is combined with acacia (gum arabic), which is derived from the hardened sap of the acacia tree. Acacia is a complex mixture of glycoproteins and polysaccharides, and it is often used as a stabilizer in food stuffs. Aqueous solutions of acacia and gelatin can be coacervated with a non-polar internal phase, as described below, to produce clear and flexible capsules containing internal phase.

Capsules incorporating gelatin/acacia may be prepared as follows; see, for example U.S. Pat. No. 7,170,670, incorporated by reference in its entirety. In this process, an aqueous mixture of gelatin and acacia is emulsified with a hydrocarbon internal phase (or other water-immiscible phase) to encapsulate the internal phase. The mixture is heated and the pH lowered to form a gelatin/acacia coacervate, thereby forming capsules. The temperature of the resultant mixture is then lowered and an aqueous solution of glutaraldehyde (an agent for cross-linking the capsule walls) is added. The resultant mixture is then warmed and stirred vigorously. A finishing step (holding the capsule mixture at 50 C for about one hour) is used to deactivate remaining glutaraldehyde, thereby assuring that the capsules will separate during sieving. The process yields capsules in the range of 20-100 µm and often incorporates over 50 percent of the starting materials into useable capsules. The capsules produced are then separated by size by sieving or other size exclusion sorting. After size sorting, the capsules are mixed with the binder to create a slurry for coating, e.g., using slot coating, knife coating, spin coating, etc. The weight ratio of capsule to binder in the electro-optic medium may be 4:1 to 50:1, more preferably 10:1 to 30:1, and most preferably about 15:1.

The electro-optic media made according to the various embodiments of the present invention may be incorporated into electro-optic displays and assemblies. An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance

EXAMPLES

Aqueous capsule slurries comprising gelatin/acacia microcapsules having a mean size of approximate 40 µm containing a dispersion of white and three different colored pigments (cyan, magenta, and yellow) in a nonpolar solvent were mixed into four different binders; A) a poly(vinyl alcohol) with cationic side chains, B) a low molecular weight polyvinylpyrrolidone with cationic side chains, C) a high molecular weight polyvinylpyrrolidone with cationic side chains, and D) a polyurethane dispersion control. Each binder was mixed at a ratio of 1 part by weight binder to 15 parts by weight of capsules. The polyurethane binder was also mixed with thickeners, a small molecule ionic dopant, and coating aids. The resultant mixtures were bar coated on to a 125 µm thick indium-tin oxide coated polyester film. The coated film was dried to produce an electrophoretic medium approximately 21 µm thick (18-25 g/m$^2$ depending on density) containing essentially a single layer of capsules. Each dried film was laminated with a polyurethane adhesive doped with conductive salts, which was subsequently laminated to a screen-printed backplane assembly approximately 2 inches square to create an electrophoretic display test module. The module was driven using a waveform summarized in Table 1. The basic waveform is divided into six sections, each 20.5 seconds long. During each section a square-wave AC fundamental with 30 Hz frequency is offset by a DC voltage as shown in the table (not every offset is shown, but the sequence should be obvious from the table entries). The duty cycle of the square wave AC (i.e., the proportion of the time of one cycle of positive and negative voltages during which the positive voltage is applied) is varied as shown in the table. The whole test consists of three repetitions of the basic waveform, each time with a different voltage offset sequence, shown as "High V offset", "Mid V offset" and "Low V offset". Thus, for example, the initial "High V offset" is −15V. The magnitude of the square wave AC is +/−30V for the "High V offset" sequence, +/−20V for the "Mid V offset" sequence, and "+/−10V for the "Low V offset" sequence.

TABLE 1

| Section | High V square wave AC magnitude (+/−V) | High V offset (V) | Mid V square wave AC magnitude (+/−V) | Mid V offset (V) | Low V square wave AC magnitude (+/−V) | Low V offset (V) | Square wave AC frequency (Hz) | Square wave AC duty cycle (%) | Duration (ms) |
|---|---|---|---|---|---|---|---|---|---|
| 1 | 30 | −15 | 20 | −10 | 10 | −5 | 30 | 30 | 500 |
|  | 30 | −14.25 | 20 | −9.5 | 10 | −4.75 | 30 | 30 | 500 |
|  | 30 | . . . | 20 | . . . | 10 | . . . | 30 | 30 | 500 |

TABLE 1-continued

| Section | High V square wave AC magnitude (+/−V) | High V offset (V) | Mid V square wave AC magnitude (+/−V) | Mid V offset (V) | Low V square wave AC magnitude (+/−V) | Low V offset (V) | Square wave AC frequency (Hz) | Square wave AC duty cycle (%) | Duration (ms) |
|---|---|---|---|---|---|---|---|---|---|
|   | 30 | 14.25 | 20 | 9.5 | 10 | 4.75 | 30 | 30 | 500 |
|   | 30 | 15 | 20 | 10 | 10 | 5 | 30 | 30 | 500 |
| 2 | 30 | −15 | 20 | −10 | 10 | −5 | 30 | 50 | 500 |
|   | 30 | −14.25 | 20 | −9.5 | 10 | −4.75 | 30 | 50 | 500 |
|   | 30 | ... | 20 | ... | 10 | ... | 30 | 50 | 500 |
|   | 30 | 14.25 | 20 | 9.5 | 10 | 4.75 | 30 | 50 | 500 |
|   | 30 | 15 | 20 | 10 | 10 | 5 | 30 | 50 | 500 |
| 3 | 30 | −15 | 20 | −10 | 10 | −5 | 30 | 70 | 500 |
|   | 30 | −14.25 | 20 | −9.5 | 10 | −4.75 | 30 | 70 | 500 |
|   | 30 | ... | 20 | ... | 10 | ... | 30 | 70 | 500 |
|   | 30 | 14.25 | 20 | 9.5 | 10 | 4.75 | 30 | 70 | 500 |
|   | 30 | 15 | 20 | 10 | 10 | 5 | 30 | 70 | 500 |
| 4 | 30 | 15 | 20 | 10 | 10 | 5 | 30 | 30 | 500 |
|   | 30 | 14.25 | 20 | 9.5 | 10 | 4.75 | 30 | 30 | 500 |
|   | 30 | ... | 20 | ... | 10 | ... | 30 | 30 | 500 |
|   | 30 | −14.25 | 20 | −9.5 | 10 | −4.75 | 30 | 30 | 500 |
|   | 30 | 15 | 20 | −10 | 10 | −5 | 30 | 30 | 500 |
| 5 | 30 | 15 | 20 | 10 | 10 | 5 | 30 | 50 | 500 |
|   | 30 | 14.25 | 20 | 9.5 | 10 | 4.75 | 30 | 50 | 500 |
|   | 30 | ... | 20 | ... | 10 | ... | 30 | 50 | 500 |
|   | 30 | −14.25 | 20 | −9.5 | 10 | −4.75 | 30 | 50 | 500 |
|   | 30 | 15 | 20 | −10 | 10 | −5 | 30 | 50 | 500 |
| 6 | 30 | 15 | 20 | 10 | 10 | 5 | 30 | 70 | 500 |
|   | 30 | 14.25 | 20 | 9.5 | 10 | 4.75 | 30 | 70 | 500 |
|   | 30 | ... | 20 | ... | 10 | ... | 30 | 70 | 500 |
|   | 30 | −14.25 | 20 | −9.5 | 10 | −4.75 | 30 | 70 | 500 |
|   | 30 | 15 | 20 | −10 | 10 | −5 | 30 | 70 | 500 |

As the display was electrically driven, various optical states were generated and reflection spectra were acquired. These were used to calculate CIE L*, a* and b* values for the light reflected from the display as the waveform was applied. For each spectral sample, a distance in L*a*b* space of the color of the display from each of the eight SNAP (Specifications for Newsprint Advertising Production) color standard primaries was calculated in units of ΔE*. For each electrophoretic display tested, the minimum distances of the colors displayed from the SNAP primaries were recorded. The primary colors were red, green, blue, yellow, cyan, magenta, white and black (R, G, B, Y, C, M, W, and K). The lower the distance, the closer is the performance of the electrophoretic display to the SNAP target, indicating better color saturation of the optical state of the display. The primary colors of the inventive displays were significantly closer to the SNAP color value compared to those of the control electrophoretic display. The results are summarized in Table.

TABLE 2

| Binder Polymer | Primary Color ΔE* of display state versus SNAP standard | | | | | | | | Avg. ΔE* versus SNAP Standard | Volume Color Gamut |
|---|---|---|---|---|---|---|---|---|---|---|
|   | R | G | B | Y | C | M | W | K |   |   |
| A) Cationic PVOH | 9 | 17 | 1 | 3 | 14 | 7 | 3 | 1 | 6.9 | 110148 |
| B) Cationic PVP 100 kg/mol | 11 | 11 | 5 | 0 | 16 | 16 | 6 | 1 | 8.3 | 79410 |
| C) Cationic PVP 1000 kg/mol | 9 | 13 | 0 | 2 | 16 | 15 | 5 | 0 | 7.5 | 85567 |
| D) Doped polyurethane Control | 18 | 23 | 9 | 9 | 20 | 19 | 3 | 0 | 12.6 | 48805 |

Figure 2:
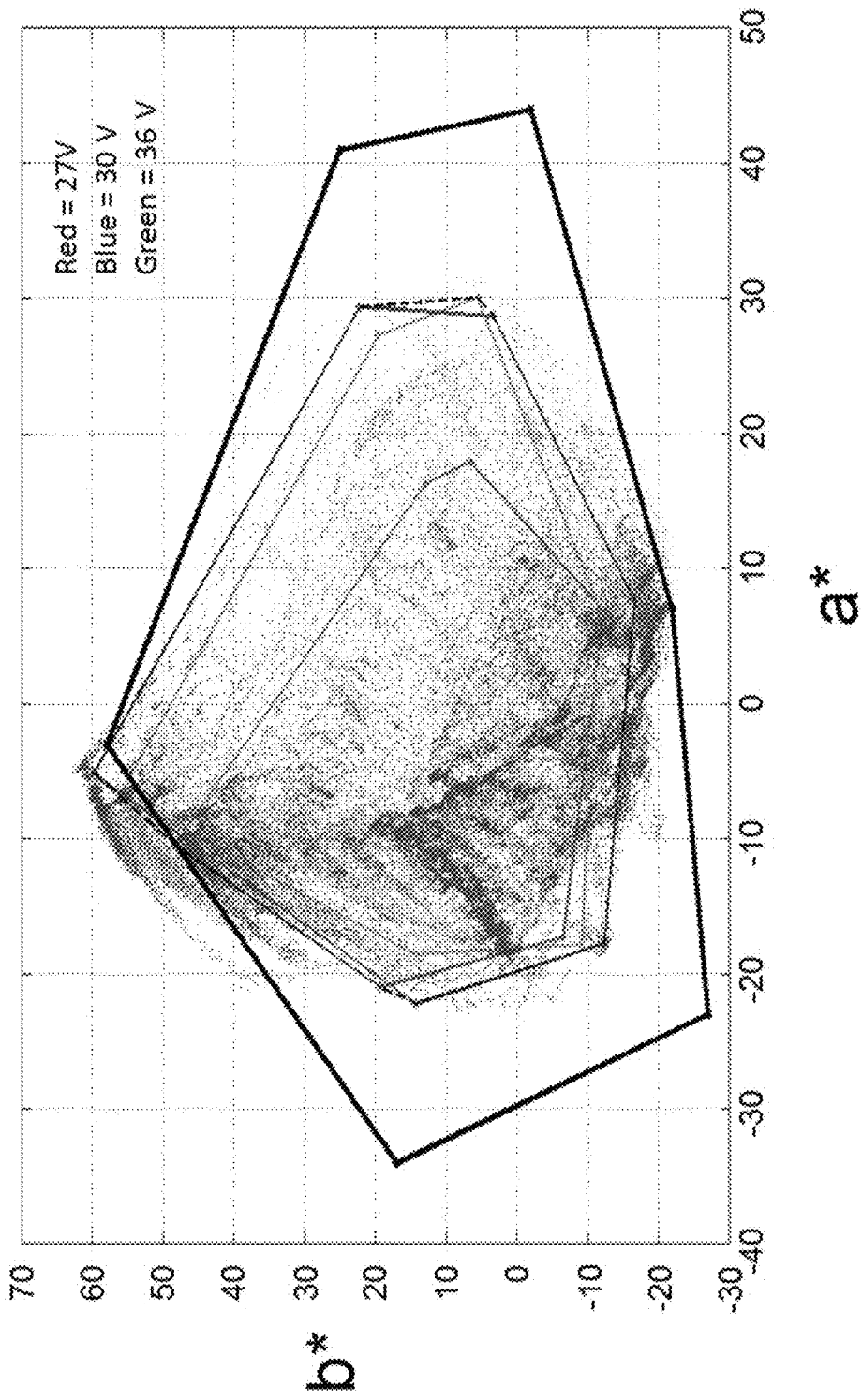
Figure 3:
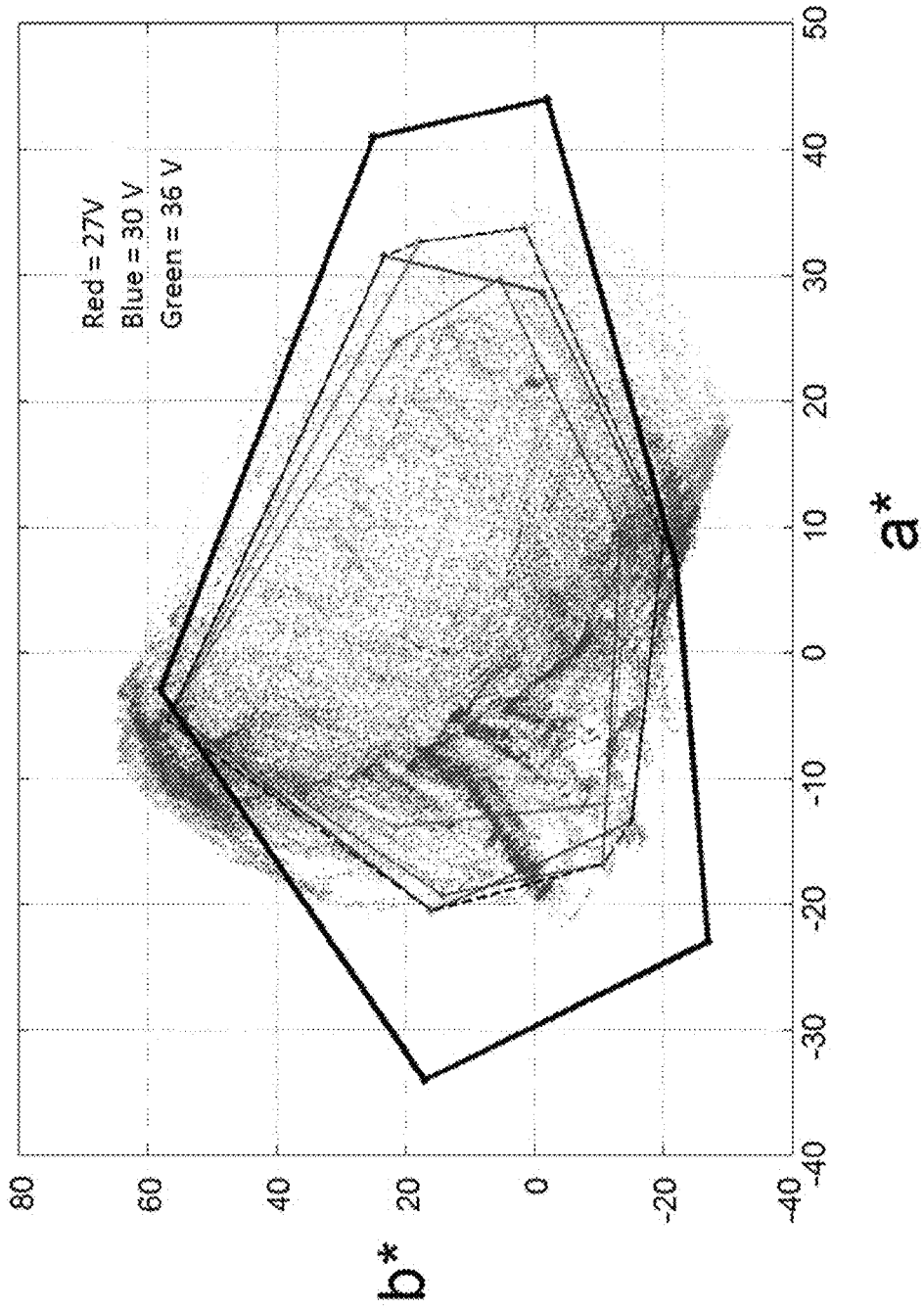
Figure 4:
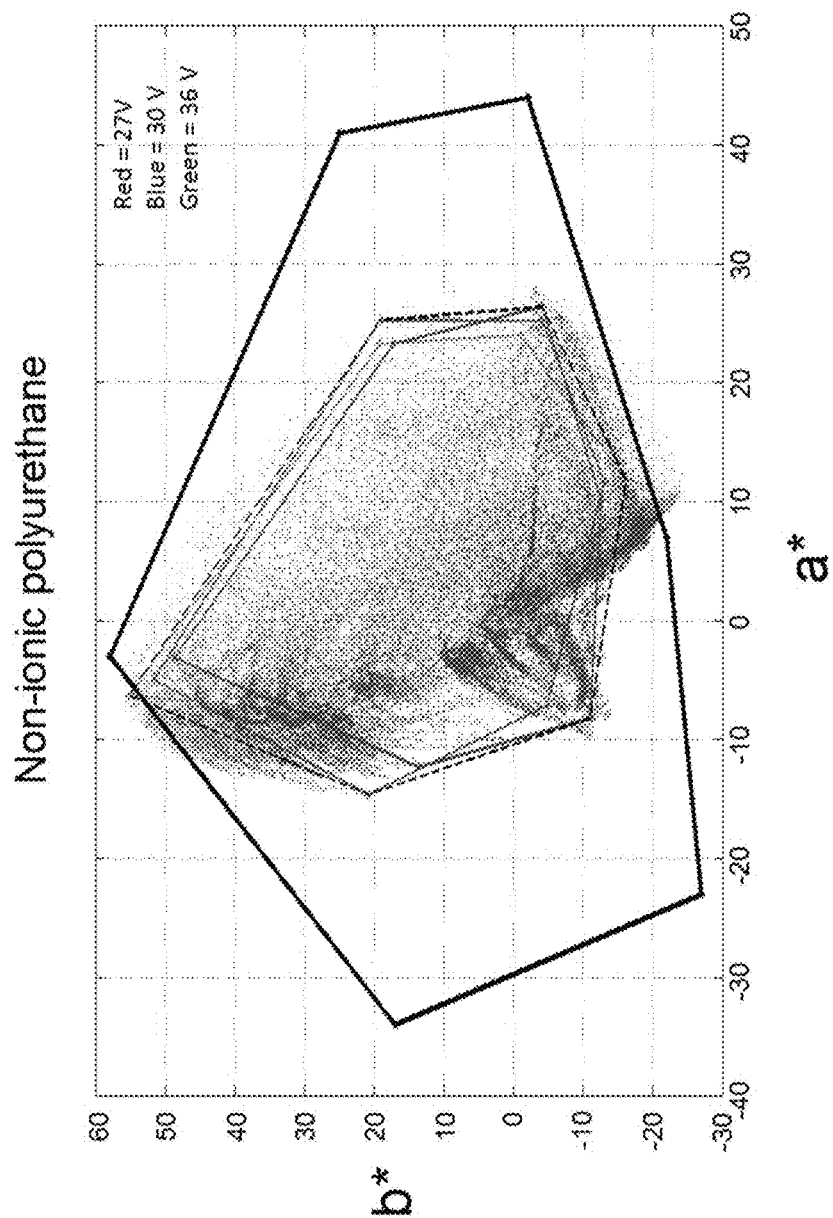
FIG. 4 is a graph illustrating a color gamut produced from colors measured from a display sample comprising an electro-optic medium having a binder not in accordance with an embodiment of the present invention.

Color gamut results: In addition to primary color measurements provided in Table 2, the full volume color gamut from all measured points was determined for each electrophoretic display. Larger volume color gamut indicates an electrophoretic device of higher color capability. The results of this assessment are provided in FIGS. 1 to 4. Referring to these Figures, the overall color gamut for the electrophoretic displays made with binders comprising a polymer with ionic side chains (inventive electrophoretic media) was approximately twice the size of the control display, which was made with control binder comprising small-molecule-doped polyurethane dispersion. More specifically, electrophoretic displays comprising inventive binders A, B, and C (corresponding to FIGS. 1, 2, and 3) have volume color gamuts of approximately 110,000, 79,000, and 86,000 versus 49,000 for the control display (corresponding to FIG. 4).

Evaluations of electrophoretic displays comprising the control and inventive electrophoretic media at different temperatures (0° C., 25° C., and 50° C.) were also performed. They showed that the display that comprise inventive electrophoretic media with binder comprising polymers with cationic side chains provide improved color performance, that is, more saturated primary colors and larger volume color gamut, compared to the display that comprises the control electrophoretic medium with polyurethane dispersion including small molecule dopants.

Figure 5A:
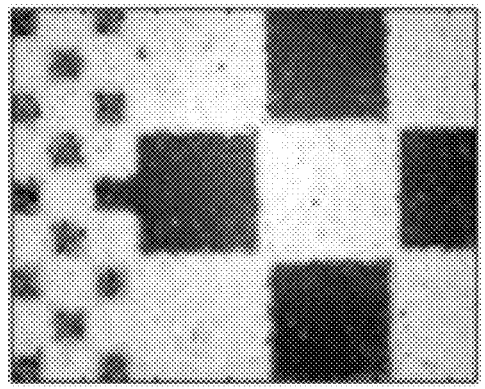
FIGS. 5A and 5B are photographs of blooming results of a display samples comprising an adhesive layer having a low concentration of ionic dopant and an electro-optic media having a binder according to an embodiment of the present invention.
Figure 5B:
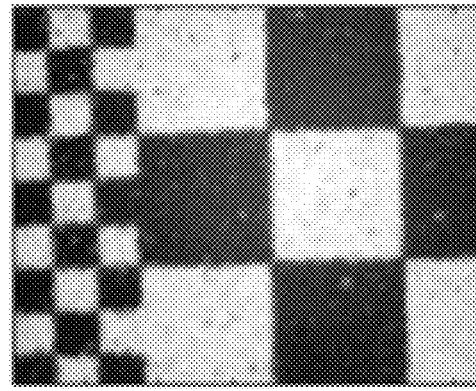
Figure 6A:
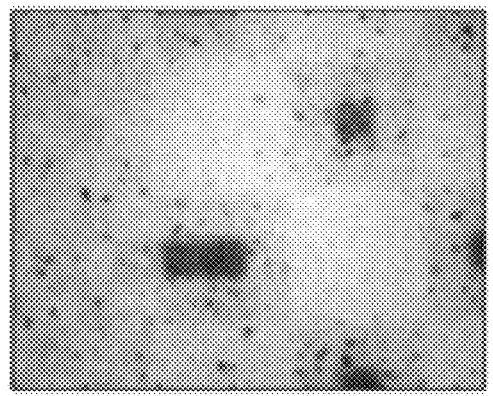
FIGS. 6A and 6B are photographs of blooming results of a display sample comprising an adhesive layer having a high concentration of ionic dopant and an electro-optic media having a binder not in accordance with the embodiment of the present invention.
Figure 6B:
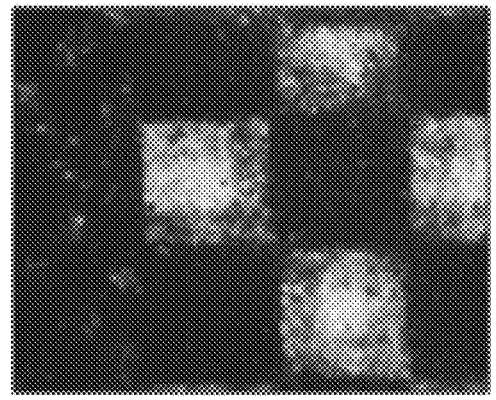

Blooming results: Blooming evaluations were made using a Mikrotron K/W Camera at 50× magnification at 25° C. and 35° C., switched from both a K (black) and W (white) background, using an EVK3 with a TPC 28V controller, and 1000 ms pulses at 65 Hz. The samples were switched to checkerboard patterns from the previous state and the optical shift was normalized to the dynamic range. The electrophoretic display comprising (a) the inventive electrophoretic medium with a poly(vinyl alcohol) having cationic side chains polymer binder (Binder A), and (b) an adhesive layer having an ionic dopant (tetrabutylammonium hexafluorophosphate) at a concentration of 180 ppm, exhibited very little blooming at both temperatures. FIGS. 5A and 5B show the result of blooming evaluation at 25° C. On the other hand, an electrophoretic display comprising (a) an electrophoretic medium with a polyurethane dispersion control binder (Binder D) and (b) an adhesive layer having an ionic dopant (tetrabutylammonium hexafluorophosphate) at a high concentration of 1000 ppm, bloomed extensively even at 25° C. (see FIGS. 6A and 6B), losing resolution in the display. The resolution loss increased at higher temperatures (35° C.). As mentioned above, increasing the conductivity of the lamination adhesive increases blooming. That is, the higher the dopant level in the adhesive layer of the electro-optic device, the worse the blooming. By using the inventive binder material, comprising a polymer having ionic side chains, a lower dopant concentration can be used in the lamination adhesive layer, reducing blooming at higher temperatures and at the same time preserving a good electro-optic performance at low temperatures.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense. All of the aforementioned issued patents and pending patent applications are incorporated herein by reference in their entireties.

We claim:

1. An electro-optic medium comprising an encapsulated material and a binder,
  the encapsulated material comprising capsules having capsule walls, each capsule wall surrounding an internal phase of the electro-optic medium, the internal phase of the electro-optic medium containing a plurality of electrically charged pigment particles in a suspending fluid, the encapsulated material being configured to switch optical states upon application of an electric field, and
  the binder comprising a polymer having a plurality of side chains, wherein at least a portion of the side chains comprise an ionic moiety.

2. The electro-optic medium of claim 1, wherein the plurality of electrically charged particles comprises at least two differently colored particles.

3. The electro-optic medium of claim 2, wherein the color of the differently colored particles are selected from the group consisting of red, green, blue, cyan, magenta, yellow, black, and white.

4. The electro-optic medium according to claim 1, wherein the weight ratio of capsules to binder is from 4:1 to 50:1.

5. The electro-optic medium according to claim 1, wherein the capsules comprise gelatin.

6. The electro-optic medium of claim 1, wherein the ionic moiety is anionic or cationic.

7. The electro-optic medium of claim 1, wherein the ionic moiety is zwitterionic.

8. The electro-optic medium of claim 1, wherein the polymer has a conductivity of $10^{-10}$ to $10^{-1}$ S/cm.

9. The electro-optic medium of claim 1, wherein the polymer has a conductivity of $10^{-6}$ to $10^{-7}$ S/cm.

10. The electro-optic medium of claim 1, wherein 5 to 100% of the side chains comprise an ionic moiety.

11. The electro-optic medium of claim 1, wherein 15 to 60% of the side chains comprise an ionic moiety.

12. The electro-optic medium of claim 1, wherein 25 to 45% of the side chains comprise an ionic moiety.

13. The electro-optic medium of claim 1, wherein the polymer has a number average molecular weight of at least 20,000 g/mol.

14. The electro-optic medium of claim 1, wherein the polymer has a number average molecular weight of 100,000 to 1,000,000 g/mol.

15. The electro-optic medium of claim 1, wherein the polymer is a linear or branched polymer.

16. The electro-optic medium of claim 1, wherein the polymer has a polymeric backbone derived from one or more polymers selected from the group consisting of polyvinyl alcohol, polyvinylpyrrolidone, polyvinyl acetate, polyacrylates, polymethacrylates, polyurethanes, polysaccharides, polyolefins, polyethers, polyesters, polypeptides, proteins, and combinations thereof.

17. The electro-optic medium of claim 1, wherein the side chains are derived from one or more compounds selected from the group consisting of sulfonic acids, phosphonic acids, quaternary amines, pyridines, imidazoles, carboxylic acids, and salts and combinations thereof.

18. An electro-optic film comprising, in order, a light-transmissive substrate, a layer of light-transmissive conductive material, and a layer of electro-optic medium according to claim 1.

19. An electro-optic display comprising in order, a light-transmissive substrate, a layer of light-transmissive conductive material, a layer of electro-optic medium according to claim 1, and a rear substrate.

20. The electro-optic display of claim 19, wherein the rear substrate comprises a plurality of electrodes.

* * * * *